US005316614A

United States Patent [19]

Phillips

[11] Patent Number: 5,316,614

[45] Date of Patent: May 31, 1994

[54] TAPE APPLICATOR FOR MASKING CARPET EDGE

[76] Inventor: Doyle S. Phillips, 2321 Newcastle, Cardiff, Calif. 92007

[21] Appl. No.: 10,076

[22] Filed: Jan. 28, 1993

Related U.S. Application Data

[63] Continuation-in-part of Ser. No. 880,747, May 12, 1992, abandoned.

[51] Int. Cl.[5] .............. B32B 31/00

[52] U.S. Cl. .............. 156/574; 156/391; 156/475; 156/523; 156/579

[58] Field of Search .............. 156/523, 527, 574, 577, 156/579, 582, 475, 391

[56] References Cited

U.S. PATENT DOCUMENTS 2,532,596 12/1950 Bobrov .............. 156/523
3,935,758 2/1976 Polzin et al. .............. 156/391
4,838,986 6/1989 Rhoades et al. .............. 156/574

FOREIGN PATENT DOCUMENTS 869555 5/1961 United Kingdom .

*Primary Examiner*—David A. Simmons
*Assistant Examiner*—James J. Engel, Jr.
*Attorney, Agent, or Firm*—Henri J. A. Charmasson

[57] ABSTRACT

A tool for temporarily laying a protective length of masking tape over the edge of a carpet along the base of a wall about to be painted, has a flared tape-laying roller that inserts a lateral portion of the masking tape between the edge of the carpet and the base of the wall down to the floor.

11 Claims, 1 Drawing Sheet

TAPE APPLICATOR FOR MASKING CARPET EDGE

PRIOR APPLICATION

This is a continuation-in-part application of copending application Ser. No. 07/880,747 filed May 12, 1992 now abandoned.

FIELD OF THE INVENTION

The present invention relates to hand-held tape-laying machines, and more specifically to masking tape-laying tools used by painters for delineating surfaces to be painted.

BACKGROUND OF THE INVENTION

Typical painting procedures used in painting walls or baseboards call for the application of a masking tape over the edge of the carpet or other floor covering abutting the wall or baseboard. The manual laying out of such a masking tape is time-consuming and does not always result in a complete masking of the floor covering. In order to fully protect the strands of carpet pile nearest to the wall or baseboard, the edge of the masking tape must be pressed against the base of the wall or of the baseboard in order to prevent any paint from running into the carpet strands. However, this procedure prevents the painting of the lower section of the wall or baseboard closest to the ground. Most painters prefer to use a large blade that is inserted between the edge of the carpet and the base of the wall or baseboard then tilted back toward the operator to allow access to the lowest part of the surface to be painted. As the wall-facing side of the blade becomes soiled with paint, it must be wiped frequently to prevent any paint from dripping around the lower edge of the blade and soil the carpet. This procedure is a two-handed operation preventing the painter from using one hand to hold the paint applicator and the other to hold the paint bucket.

There is a need for an efficient masking tape applicator that can be used prior to the painting operation to fully protect the edge of a carpet or other type of floor covering while allowing painting of the wall or baseboard down to the floor.

SUMMARY OF THE INVENTION

The principal and secondary objects of this invention are to provide a masking tape-laying hand-tool that can be used by painters to apply a protective length of masking tape above and around the edge of a carpet or other type of floor covering, and for inserting a portion of the tape nearest to the wall or baseboard down between the edge of the floor covering and the lower part of the wall or baseboard.

These and other valuable objects are achieved by a hand-held masking tape-laying tool that has a tape-laying roller having a flaring distal portion that bends the edge of the tape around the edge of the floor covering such as a carpet while at the same time pushing the strands away from the lower portion of the wall or baseboard.

DESCRIPTION OF THE PREFERRED EMBODIMENT OF THE INVENTION

Figures 1, 2, 3, 4, 5, 6, 7:
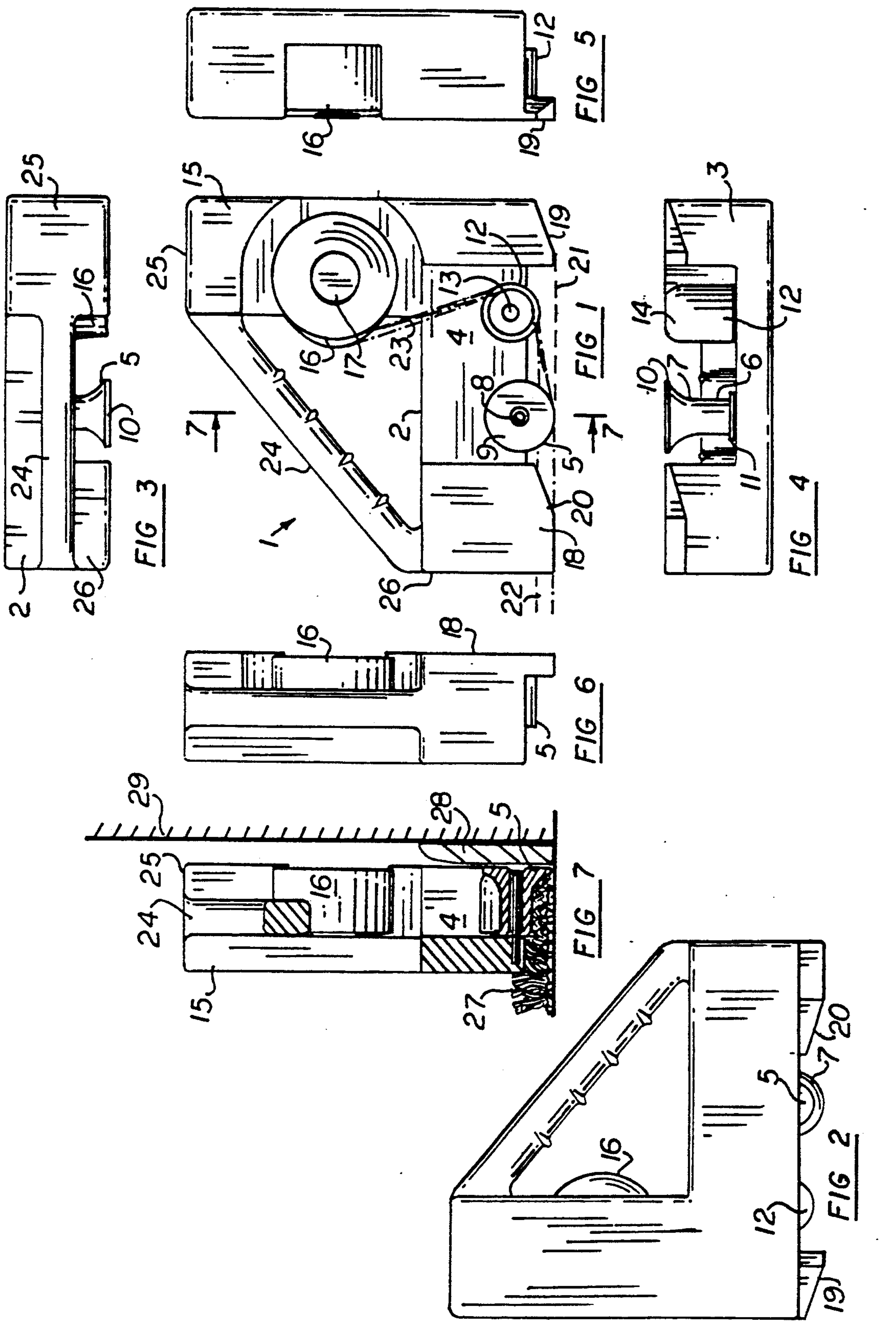
FIG. 1 is a right-side elevational view of the tape-laying tool.
FIG. 2 is a left-side elevational view thereof.
FIG. 3 is a top plan view thereof.
FIG. 4 is a bottom plan view thereof.
FIG. 5 is a front elevational view thereof.
FIG. 6 is a back elevational view thereof.
FIG. 7 is a cross-sectional view, taken along line 7–7 of FIG. 1, showing the tool in its tape-laying position at the edge of a carpet.

Referring now to the drawing, there is shown a masking tape laying tool 1 particularly adapted to laying a length of masking tape along the edge of a carpet or other floor covering, and to wrap a lateral portion of the tape around the edge of the carpet abutting the lower section of a wall, so that the wall can be conveniently painted all the way down to the floor without soiling the carpet or other floor covering.

The tool comprises a base 2 having a flat under-surface 3 intended to ride against the floor covering. The center of the base 2 is carved to define a cavity 4 opening into the flat under-surface 3. A tape-laying roller 5 is mounted within this cavity along an axis 8 substantially parallel to the flat under-surface and perpendicular to the tape-laying direction. The tape-laying roller comprises a proximal cylindrical portion 6 and of a distal portion 7 that flares out to form a wheel which has an outer surface 9 perpendicular to the axis 8, and a rim 10 whose diameter is greater than the diameter of the cylindrical proximal portion 6. The width of the tape-laying roller including the cylindrical and flaring out portions is commensurate with the width of the masking tape. A circular flange 11 at the proximal end of the tape-laying roller forms a guide for the inner edge of the masking tape. The outer surface of the cylindrical section of the tape-laying roller extends slightly below the flat under-surface of the base in order to press the tape against the floor covering 2. A tape-guiding roller 12 is rotatively mounted in a position parallel and adjacent to the tape-laying roller 5. This second roller has a distal section 14 which is arcuately tapered to a small diameter than the main body of the tape-guiding roller 12. The axial length of the distal section is substantially equal to the axial length of the tape-laying roller flaring out portion 7.

A post 15 extending upwardly from the base 2 supports a roll of masking tape 16 on an axle 17. The distal end of this axle is preferably shifted slightly forward in relation to the root of the axle. This twists the back of the roll of masking tape toward the wall, and assures a better alignment of the masking tape with the tape-guiding roller to the axles of the tape-laying roller and tape-guiding roller.

The right and lateral wall surface 18 of the base lies in the same vertical plane as the outer face 9 of the tape-laying roller 5, and has two downward projections 19, 20 astride the tape-laying roller. These projections extend to a line 21 which is also tangent to the rim 10 of the wheel defined at the distal end of the tape-laying roller. These projections are designed to extend below the edge of the floor covering against the base of the wall down to the floor.

It can now be understood that when the masking tape 23 is threaded as shown in broken line in FIG. 1 and fed between the edge of the floor covering and the tape-laying roller 5 and the flaring-out portion of the tape-laying roller is run, as shown in FIG. 7 between the edge of the carpet and the abutting wall, a lateral portion of the masking tape nearest to the wall will be wrapped around the edge of the carpet or other type of floor covering. As the tape 23 is threaded around the tape-guiding roller 12, the lateral portion closest to the wall is bent upwardly by the tapering distal portion 14 before being bent downwardly by the flaring-out portion 7 of the tape-laying roller 5. This up and down movement of the masking tape border, as it comes in contact with the edge of a carpet pile, results in the masking tape border wrapping around the strands of carpet and tucking them safely under the masking tape.

A handle 24 obliquely spans the upper portion 25 of the post 15 and the rear section 26 of the base 2. The operator, grabbing this handle with his right hand can run the tool along the edge of a carpet or other floor covering abutting a wall to conveniently lay a length of protective masking tape. The relative positions of the tool 1, floor covering 27, tape-laying roller 5 and base-board 28 along the lower end of a wall 29 are best illustrated in FIG. 7.

The forward extension 19 is tapered like a plowshare to conveniently comb the strands of a carpet away from the wall just before they come in contact with the wrapping border of the masking tape as the latter progresses from the tape-guiding roller 12 to the tape-laying roller 5, thus helping to safely tuck them under the masking tape. The second projection 20 which is mounted after the tape-laying roller 5 is similarly tapered to conveniently press the wrapped-around portions of the masking tape against the edge of the floor covering.

It should be noted that a left-hand operated tool can be made by mounting the rollers on the left wall of the cavity.

While the preferred embodiments of the invention have been described, modifications can be made and other embodiments may be devised without departing from the spirit of the invention and the scope of the appended claims.

What is claimed is:

1. A tool for laying a length of tape along the edge of a structure and for wrapping a lateral portion of said tape around said edge, said tool comprising:

a base having a substantially flat under-surface for riding above said structure;

said base defining a cavity opening into said flat under-surface;

a tape-laying roller rotatively mounted into said cavity about a first axis substantially parallel to said flat under-surface and substantially perpendicular to said edge;

said tape-laying roller comprising a cylindrical section, and a flaring, circular portion expanding radially and axially from one end of said cylindrical portion, said cylindrical portion having a peripheral wall extending out of said cavity beyond said under-surface; and means for feeding said length of tape between said structure and said tape-laying roller when said flat under-surface is run along said edge of the structure, said means for feeding comprise:

means for bending said lateral portion of said tape away from said edge prior to said tape engaging said tape-laying roller.

2. The tool of claim 1, wherein said means for feeding further comprise:

a roll of tape;

means for rotatively holding said roll of tape above said flat under-surface;

and wherein said means for bending comprise:

a tape-guiding roller positioned between said roll of tape and said tape-laying roller, said tape-guiding roller being rotatively held about a second axis substantially parallel to said first axis, said tape-guiding roller comprising a cylindrical main body and an arcuately tapered distal portion.

3. The tool of claim 2, wherein said base has a lateral wall defining a flat outer surface along a plane perpendicular to said flat under-surface and to said first and second axis;

said tape-laying roller having a flat, circular distal end laying within said plane.

4. The tool of claim 3, wherein said base comprises a first guiding projection extending along said plane downwardly from said under-surface.

5. The tool of claim 4, wherein said first guiding projection comprises a tapered leading edge.

6. The tool of claim 4, wherein said base comprises a second guiding projection extending along said plane downwardly from said outer surface, said first and second guiding projections being positioned astride said flaring circular portion of the tape-laying roller.

7. The tool of claim 6, wherein said first and second projections extend down to a straight line tangent to said circular distal end of the tape-laying roller.

8. The tool of claim 7, which further comprises a handle secured to said base.

9. The tool of claim 8, wherein said means for holding said roll of tape comprises a post extending vertically from one end section of said base; and said handle spanning an opposite end-section of said base and an upper section of said post.

10. A tool for laying a length of masking tape along the edge of a carpet abutting a lower wall section and for inserting a lateral portion of said masking tape between said edge and said lower wall section, said tool comprising:

a tape-laying roller held orthogonally to said wall, said tape-laying roller having a cylindrical proximal portion and a distal portion arcuately flaring out from said cylindrical section to form a wheel having a larger diameter than said cylindrical section;

a tape-guiding roller held orthogonally to said wall, said tape-guiding roller having a cylindrical proximal portion and a distal portion arcuately tapering in from said cylindrical section to form and end having a smaller diameter than said cylindrical section; and means for feeding said length of tape under said tape-laying roller.

11. The tool of claim 10, wherein said means for feeding comprises:

a supply of masking tape; and wherein said tape-guiding roller is rotatively mounted between tape-laying roller and said roll of tape;

said distal portion of said tape-guiding roller being axially commensurate with the flaring out portion of the tape-laying roller.

* * * * *